Oct. 12, 1926.

E. A. ERICKSON 1,603,199

PLOWPOINT

Filed June 24, 1925

Inventor
E. A. Erickson.

By William E. Linton
Attorney

Patented Oct. 12, 1926.

1,603,199

UNITED STATES PATENT OFFICE.

ERICK A. ERICKSON, OF JENS, MONTANA.

PLOWPOINT.

Application filed June 24, 1925. Serial No. 39,355.

This invention relates to improvements in plow points, having for an object to provide a novel form of plow point constructed of extremely hard and tough metal, which when connected to the plow-share is treated by a tempering process whereby the same will be hardened about the point proper, while the rearward portions thereof will be hardened to a less degree, thereby leaving sufficient malleability in the device adjacent its point of jointure with the share to permit of the efficient absorption of such abnormal shocks and stresses as may be imparted thereto when encountering hard substances during usage, and hence, preventing its breaking or snapping.

It is likewise an object of the invention to provide a plow point whose surface will be sufficiently hard to allow of usage of the same for an indefinite period of time without necessity of resharpening.

Other objects of the invention will be in part obvious, and in part pointed out hereinafter.

In order that the invention and its mode of use may be readily understood by persons skilled in the art, I have in the accompanying illustrative drawings, and in the detailed following description based thereupon, set out one possible embodiment of the same.

In these drawings:—

Having more particular reference to the drawings, in connection with which like characters of reference will designate corresponding parts throughout, I have shown for purposes of illustration herein, the improved point as being connected to an ordinary form of plow-share, indicated in its entirety by the numeral 1.

The improved plow point may be stated to comprise a single piece of extremely hard and tough metal, such for example, as cast steel, and is formed into the shape as shown in the accompanying drawing, one side thereof being flattened, as indicated by the numeral 2 and adapted to be arranged adjacent the land slide of the plow, while the opposite side of the same is curved as indicated by the numeral 3 to correspond to the curvature of the mold board engaging side of the share.

Figure 1:
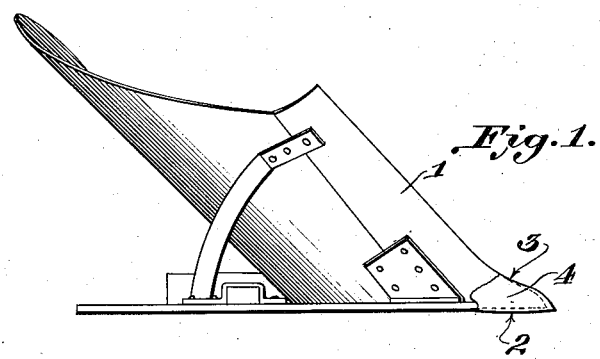
Figure 1 is a bottom view of a plow whose share is equipped with the improved point.
Figure 2:
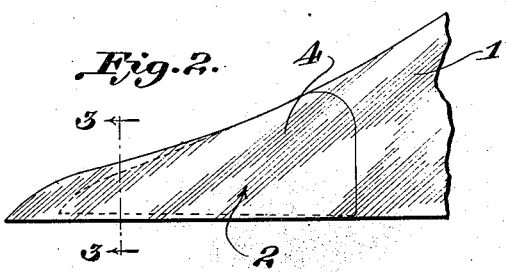
Figure 2 is a fragmentary detail in side elevation looking towards the land slide of a plow whose share is equipped with the improved point.
Figure 3:
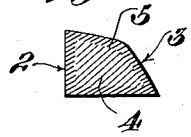
Figure 3 is a transverse section taken on the line 3—3 of Figure 2, looking in the direction in which the arrows point.
Figure 4:
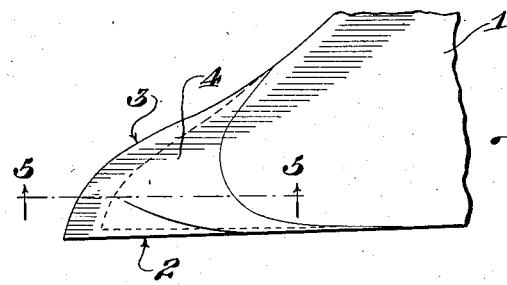
Figure 4 is a fragmentary detail in top plan of a share equipped with the improved point; and, Figure 5 is a vertical longitudinal section through the same, taken on the line 5—5 of Figure 4, looking in the direction in which the arrows point.
Figure 5:
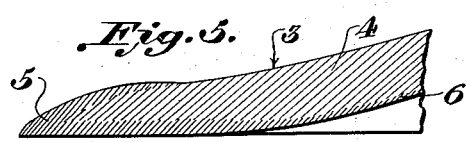

The rearward portion of the plow point, generally designated by the numeral 4, is adapted to be connected by welding, or similar process, to the plow share in the manner clearly indicated in the Figures 1 and 4 and thus, practically becomes an integral portion of the share. Subsequently to this joining of the plow point 2 to the share 1 by the welding process, the point and an adjacent portion of the share is heated in a furnace, or other suitable device, the forward portion of the plow point, that is, the point proper thereof, being brought preferably to a white heat, while the extreme rearward portion thereof and the adjacent portion of the plow share is heated to a less degree. With the point and share thus heated, the two are then immersed in a cooling solution, such as cold water, the share being introduced into the cold water first from the rearward end of the same with the plow point uppermost. The immersion of the heated portion of the plow share and the highly heated plow point 4 is quickly effected, and the tempering process resulting therefrom is such as to effect the cooling of the plow point 2 in a manner such as to harden the forward and rearward portions of the same, as is indicated by the shading in the Figures 3 and 5, and identified by the numerals 5 and 6, respectively. The case hardening of the forward portion of the plow point 4, that is, that portion indicated by the numeral 5 will be effected to a greater degree than will be the rearward portion thereof, such as indicated by the numeral 6, thus rendering such forward portion of the plow point extremely hard and tough and brittle in nature, while the rearward portion thereof, as indicated by the numeral 6, has a certain amount of its malleability left therein, thereby imparting to it a degree of flexibility sufficient to permit the improved plow point to effectually absorb such abnormal shocks and stresses as may be directed thereto during usage, as for example, when the plow point is abruptly engaged with submerged or imbedded stone, tree roots, and other hard substances. Because of this remaining property of malleability in the plow point 4 adjacent its point of jointure or welding with the share 1, it will be understood that the breaking or snapping of the point adjacent said point of jointure will be avoided and thereby, the practicability and efficiency of the device will be in no way impaired.

Due to the hardening of the outer surfaces of the plow point 4 and especially about the point proper of the same, as indicated herein by the numeral 5, said plow point will be permitted to be advantageously and successfully used for an indefinite period of time without necessity of resharpening, irrespective of the nature or characteristics of the soil worked or plowed thereby.

Manifestly, the construction shown is capable of considerable modification, and such modification as is within the scope of my claim, I consider within the spirit of my invention.

I claim:—

The herein described process of treating plow points and securing the same to shares, which consists of the joining by welding of a plow point formed of a metal possessing maximum stress resisting properties and a certain degree of elasticity to the fore portion of a share formed of corresponding metal, then subjecting said point to heat to bring the forward portion thereof to a glowing incandescence while the rearward portion of the same is heated to a lesser degree, then gradually and evenly immersing the point while so heated in a cooling solution by moving it downwardly into such solution with the free end of the plow point uppermost whereby to effect the case hardening of the outer surface and forward portion of said point to a maximum degree and to gradually shade and decrease the hardening of the remaining portion of the point through its jointure with the share whereat the physical properties of said point will correspond to those of the share.

In witness whereof I have hereunto set my hand.

ERICK A. ERICKSON.